US012568441B2

(12) United States Patent \
Galati Giordano et al.

(10) Patent No.: US 12,568,441 B2 \
(45) Date of Patent: Mar. 3, 2026

(54) POWER CONTROL OF SPATIAL REUSE FOR SUPPORTING TIME SENSITIVE COMMUNICATION IN THE UNLICENSED BAND

(71) Applicant: NOKIA TECHNOLOGIES OY, Espoo (FI)

(72) Inventors: Lorenzo Galati Giordano, Dublin (IE); Adrian Garcia Rodriguez, Sta. Cruz Tenerife (ES); Tao Tao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 496 days.

(21) Appl. No.: 18/012,503

(22) PCT Filed: Jul. 1, 2020

(86) PCT No.: PCT/CN2020/099764 \
§ 371 (c)(1), \
(2) Date: Dec. 22, 2022

(87) PCT Pub. No.: WO2022/000377 \
PCT Pub. Date: Jan. 6, 2022

(65) Prior Publication Data \
US 2023/0254774 A1 Aug. 10, 2023

(51) Int. Cl. \
*H04W 52/14* (2009.01) \
*H04B 7/06* (2006.01)

(52) U.S. Cl. \
CPC .......... *H04W 52/14* (2013.01); *H04B 7/0626* (2013.01)

(58) Field of Classification Search \
None \
See application file for complete search history.

(56) References Cited

U.S. PATENT DOCUMENTS

2017/0126340 A1 5/2017 Li et al. \
2017/0164301 A1 6/2017 Jeon et al. \
(Continued)

FOREIGN PATENT DOCUMENTS

CN 109716832 A 5/2019 \
CN 111277383 A 6/2020

OTHER PUBLICATIONS

Notification of the First Office Action dated Feb. 28, 2025, corresponding to Chinese Patent Application No. 2020801025442, with English translation thereof.

(Continued)

*Primary Examiner* — Minh Trang T Nguyen \
(74) *Attorney, Agent, or Firm* — SQUIRE PATTON BOGGS (US) LLP

(57) ABSTRACT

Embodiments of the present disclosure relate to device, method, apparatus and computer readable storage medium of power control of spatial reuse for supporting TSC in the unlicensed band. The method comprises in accordance with a determination that a sounding packet is transmitted from a second device, determining CSI of channels between the second device and the third device; determining, at least partially based on the CSI, an applicable transmitting power for a first transmission from the first device to a fourth device during a second transmission for a reception of the feedback of the at least one packet sent from a third device to the second device; and performing the first transmission based on the applicable transmitting power during the second transmission. In this way, a transmission of DL TSC packets that has a time scheduling requirement in contrast with the spatial reuse time window can be achieved. Meanwhile, the harmful interference to NOTSN AP during the Block Acknowledgement reception can be avoid.

15 Claims, 5 Drawing Sheets

(56)                 References Cited

U.S. PATENT DOCUMENTS

| | | | |
|---|---|---|---|
| 2018/0132234 A1 | 5/2018 | Cavalcanti et al. | |
| 2018/0205427 A1 | 7/2018 | Ghosh et al. | |
| 2018/0316557 A1 | 11/2018 | Frangieh et al. | |
| 2019/0028168 A1 | 1/2019 | Vermani et al. | |
| 2019/0296873 A1 | 9/2019 | Gupta et al. | |
| 2021/0352662 A1* | 11/2021 | Sheriff | H04W 52/34 |

OTHER PUBLICATIONS

Lopez-Perez, et al., "Downlink spatial reuse parameter framework with coordinated beamforging/null steering for 802.11be," IEEE 802.11-19/1779r5, Nov. 11, 2019, IEEE Mentor, Jan. 14, 2020, XP055778546.

Lopez-Perez, et al., "Coordinated Beamforging/Null Steering Protocol in 802.11be," IEEE 802.11-19/1594r0, Sep. 16, 2019, IEEE Draft; 11-19-1594-02-00be-coordinated-beamforging-null-steering-protocol-in-802-11be, IEEE-SA mentor, vol. 802.11 EHT; 802.11be, No. 2, Oct. 10, 2019, XP068154086.

Liu et al., "On Coordinated Spatial Reuse in 11be," IEEE 802.11-20/0073r0, Nov. 2019, IEEE Draft; 11-20-0073-00be-on-coordinated-spatial-reuse-in-11be, IEEE-SA mentor, vol. 802.11be, No. 0, Nov. 11, 2020, XP068165073.

Aio et al., "Discussion on Coordinated Spatial Reuse Operation," IEEE 802.11-20/0457r0, Mar. 26, 2020, IEEE Draft; 11-20-0457-00-00be-discussion-on-coordinated-spatial-reuse-operation, IEEE-SA mentor, vol. 802.11 EHT; 802.11be, No. 0, Mar. 26, 2020, XP068167237.

International Search Report and Written Opinion dated Mar. 31, 2021 corresponding to International Patent Application No. PCT/CN2020/099764.

Extended European Search Report dated Feb. 23, 2024 corresponding to European Patent Application No. 20942597.4.

Communication pursuant to Article 94(3) EPC dated May 2, 2025, in corresponding European Patent Application No. 20 942 597.4.

* cited by examiner

200

210

DETERMINE CSI

220

DETERMINE AVAILABLE TRANSMITTING POWER AT LEAST PARTIALLY BASED ON CSI

230

PERFORM FIRST TRANSMISSION BASED ON AVAILABLE TRANSMITTING POWER

POWER CONTROL OF SPATIAL REUSE FOR SUPPORTING TIME SENSITIVE COMMUNICATION IN THE UNLICENSED BAND

FIELD

Embodiments of the present disclosure generally relate to the field of telecommunication and in particular, to device, method, apparatus and computer readable storage medium of power control of spatial reuse for supporting Time Sensitive Communication (TSC) in the unlicensed band.

BACKGROUND

The 802.11be new Task Group (TG) "Extremely High Throughput (EHT)" has been approved to initiate discussions on new Wi-Fi features for bands between 1 and 7.125 GHz. Null steering is one of the topics that has captured significant attention in the 802.11be TG to further boost spatial reuse, and consequently network performance.

In addition, 802.11be has initiated discussions on how to support TSC currently widely adopted in many modern cyber-physical systems, such as automobiles, airplanes, industrial automation systems, or distributed computer systems. Time-sensitive communication networks (TSN) mainly relies on a time management controller that guarantees reliable delivery of packets with deterministic delay and very small jitter, but so far, they have been implemented only over the wired domain.

For Wi-Fi, embracing TSN constitutes an important step to remain competitive with respect to licensed technologies, like Long Term Evolution (LTE) or 5th generation mobile networks (5G), into the enterprise and factory domain.

SUMMARY

In general, example embodiments of the present disclosure provide a solution of power control of spatial reuse for supporting TSC in the unlicensed band.

In a first aspect, there is provided a first device. The first device comprises at least one processor; and at least one memory including computer program codes; the at least one memory and the computer program codes are configured to, with the at least one processor, cause the first device at least to, in accordance with a determination that a packet is transmitted from a second device, determine Channel State Information, CSI, of a channel between the second device and the third device; determine, at least partially based on the CSI, an applicable transmitting power for a first transmission from the first device to a fourth device during a second transmission for a reception feedback for the at least one packet sent from a third device to the second device; and perform the first transmission based on the applicable transmitting power during the second transmission.

In a second aspect, there is provided a method. The method comprises in accordance with a determination that a packet is transmitted from a second device, determining Channel State Information, CSI, of a channel between the second device and the first device; determining, at least partially based on the CSI, an applicable transmitting power for a first transmission from the first device to a fourth device during a second transmission for a reception feedback for the at least one packet sent from a third device to the second device; and performing the first transmission based on the applicable transmitting power during the second transmission.

In a third aspect, there is provided an apparatus comprises means for, in accordance with a determination that a packet is transmitted from a second device, determining Channel State Information, CSI, of a channel between the second device and the first device; means for determining, at least partially based on the CSI, an applicable transmitting power for a first transmission from the first device to a fourth device during a second transmission for a reception feedback for the at least one packet sent from a third device to the second device; and means for performing the first transmission based on the applicable transmitting power during the second transmission.

In a fourth aspect, there is provided a computer readable medium having a computer program stored thereon which, when executed by at least one processor of a device, causes the device to carry out the method according to the third aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
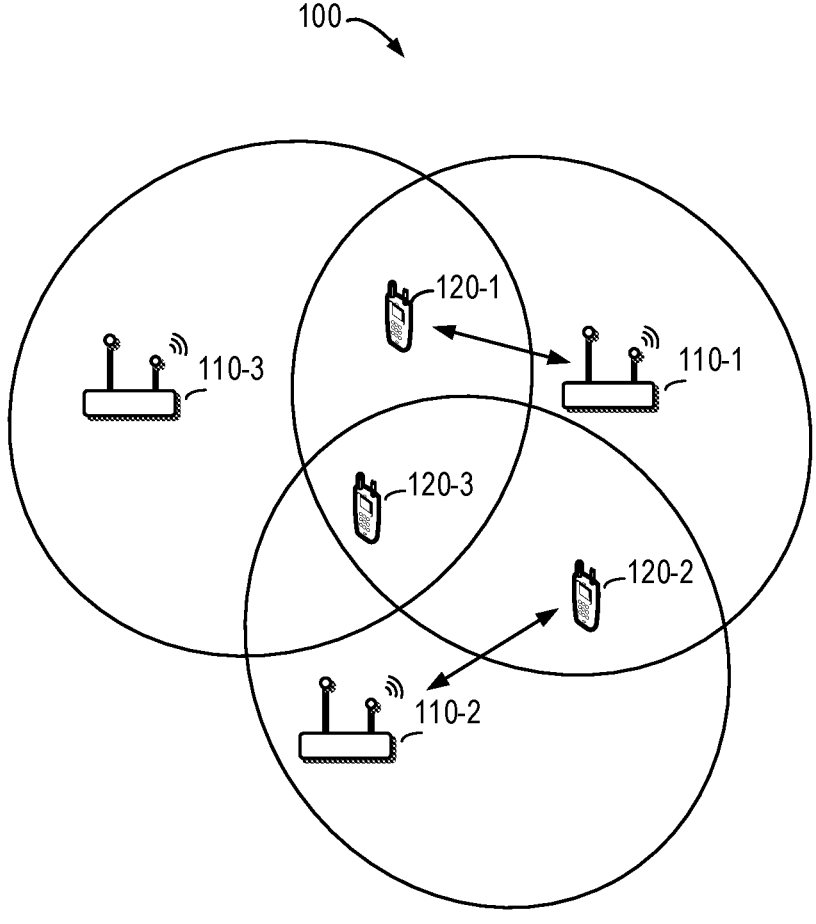
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As mentioned above, the 802.11be new Task Group (TG) "Extremely High Throughput (EHT)" has been approved to initiate discussions on new Wi-Fi features for bands between 1 and 7.125 GHz. Null steering is one of the topics that has captured significant attention in the 802.11be TG to further boost spatial reuse, and consequently network performance.

In addition, 802.11be has initiated discussions on how to support TSC currently widely adopted in many modern cyber-physical systems, such as automobiles, airplanes, industrial automation systems, or distributed computer systems. Time-sensitive communication networks (TSN) mainly relies on a time management controller that guarantees reliable delivery of packets with deterministic delay and very small jitter, but so far, they have been implemented only over the wired domain.

For Wi-Fi, embracing TSN constitutes an important step to remain competitive with respect to licensed technologies, like Long Term Evolution (LTE) or 5th generation mobile networks (5G), into the enterprise and factory domain.

FIG. 1 shows an example communication network 100 in which embodiments of the present disclosure can be implemented. As shown in FIG. 1, the communication network 100 comprises a first Access Point (AP) 110-1 (hereafter also referred to as a first device 110-1) and a first UE 120-1 (hereafter also referred to as a fourth device 120-1). The first AP 110-1 may communicate with the first UE 120-1. The communication network 100 also comprises a second AP 110-2 (hereafter also referred to as a second device 110-2) and a second UE 120-2 (hereafter also referred to as a third device 120-2). The second AP 110-2 may communicate with the second UE 120-2. The communication network 100 also comprises a third AP 110-3 and a third UE 120-3. The third AP 110-3 may communicate with the third UE 120-3. It is to be understood that the number of APs and terminal devices shown in FIG. 1 is given for the purpose of illustration without suggesting any limitations. The communication network 100 may include any suitable number of APs and terminal devices.

It is possible that a Wi-Fi network that is managed by a TSN controller may coexisting with other Wi-Fi networks not supporting TSC and deployed under the same (partially or full) coverage area. For example, in the communication network 100, the first AP 110-1 and the third AP 110-3 may support the TSN, while the second AP 110-2 may not support the TSN. In this situation, broadband packets occupying the wireless channel for few milliseconds may block the transmission of sensitive packets that have to follow the deterministic scheduling imposed by the TSN controller.

To allow the transmission of TSC packets with their correct timing, the scheme of spatial reuse has been considered. For example, new capabilities have been introduced to multi-user request-to-send (MU-RTS)/clear-to-send (CTS) procedure. The basic concept is, new fields may be introduced in the MU-RTS frame to advert the new spatial reuse opportunities and new power sensing capabilities may be provided for devices that want to avail from controlled spatial reuse opportunities during their subsequent downlink transmissions. Upon receiving a MU-RTS Trigger frame addressing the devices that needs to be served and all the others that want to avail of the new created spatial reuse opportunities, the devices which intend to avail from controlled spatial reuse opportunities transmit back their channel status information (CSI). Then the transmission phase of the AP can be proceeded with null steering and spatial reuse activated.

Although the spatial reuse opportunity is granted in the proposed scheme, however, the spatial reuse of a TSN AP must be released before the conclusion of the main DL transmission of a NOTSN AP to prevent interference during the reception of the Block Acknowledgement. For example, in the communication network 100, a transmission of the first AP 110-1 can be performed with spatial reuse opportunity during the DL transmission of the second AP 110-2 and must be released before a UL transmission to the second AP 110-2 for transmitting a Block Acknowledgement is initiated, because interference over the Block Acknowledgement is not allowed.

Thus, the proposed scheme is only effective for those TSC packets that has to be scheduled, and their transmission can be completed, within the new created spatial reuse window, but not for those TSC packets that has a different scheduling timing in contrast with the spatial reuse opportunity created.

Therefore, the embodiments of the present invention propose a solution for transmitting DL TSC packets that has a time scheduling requirement in contrast with the spatial reuse time window without interfering the transmission of the Block Acknowledgement. In this solution, the TSN AP may determine a maximal applicable DL transmitting power during the DL transmission of the NOTSN AP and perform the DL transmission with the maximal applicable DL transmitting power. In this way, a transmission of DL TSC packets that has a time scheduling requirement in contrast with the spatial reuse time window can be achieved. Meanwhile, the harmful interference to NOTSN AP during the Block Acknowledgement reception can be avoid.

Figure 2:
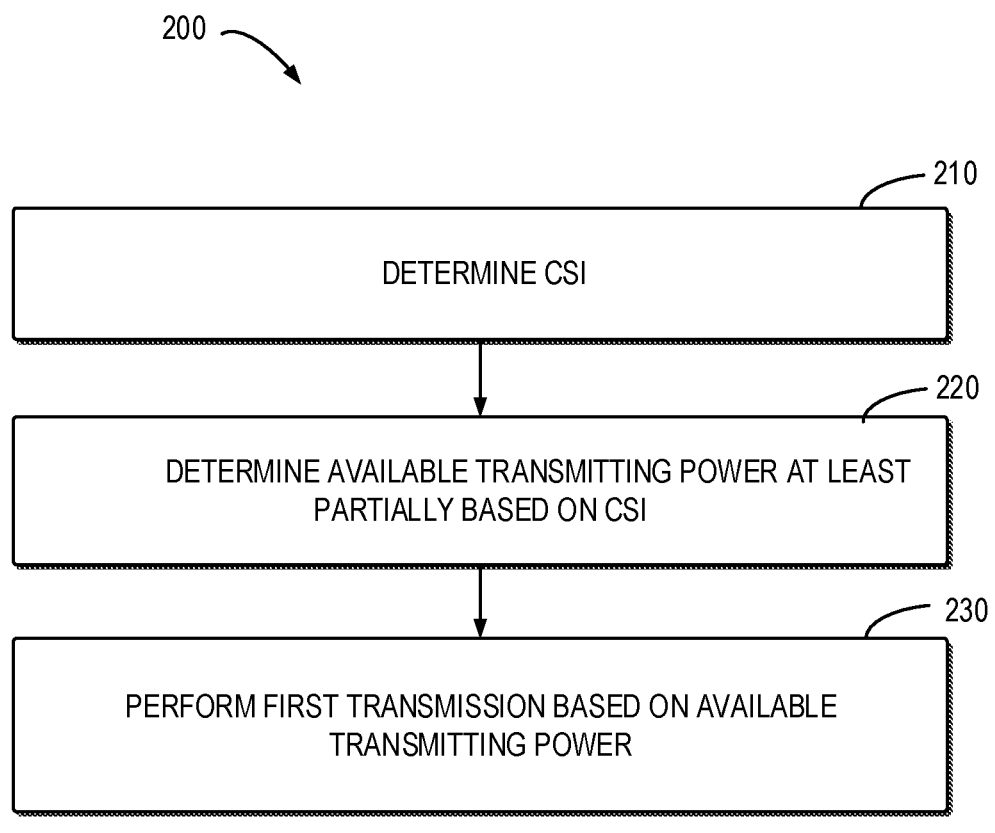
FIG. 2 shows a flowchart of an example method of power control of spatial reuse for supporting TSC in the unlicensed band according to some example embodiments of the present disclosure.

Principle and implementations of the present disclosure will be described in detail below with reference to FIGS. 2-4. FIG. 2 shows a flowchart of an example method 200 of power control of spatial reuse for supporting TSC in the unlicensed band according to some example embodiments of the present disclosure. The method 200 can be implemented at the first AP 110-1 as shown in FIG. 1. For the purpose of discussion, the method 200 will be described with reference to FIG. 1.

In the communication network 100 shown in FIG. 1, assuming that the first AP 110-1 and the third AP 110-3 are TSN APs and the second AP 110-2 is the NOTSN AP. The third AP 110-3 may have TSC packets to be scheduled and the transmission of the TSC packets of the third AP 110-3 may be completed with spatial reuse opportunity during the DL transmission of the second AP 110-2. In a scenario when the first AP 110-1 may also have TSC packets to be scheduled and however the transmission of TSC packets of the first AP 110-1 has a time scheduling requirement in contrast with the spatial reuse time window during the DL transmission of the second AP 110-2, if the first AP 110-1 intends to transmit the TSN packets during the reception of the Block Acknowledgement of the second AP 110-2, the first AP 110-1 must guarantee the transmission TSN packets would not interfere the reception of the Block Acknowledgement. Thus, the determination of an applicable transmitting power may be necessary for the TSN packet DL transmission.

As shown in FIG. 2, at 210, if the first AP 110-1 detect that a Null Data Packet (NDP) is transmitted from the second AP 110-2, the first AP 110-1 may determine Channel State Information (CSI) of channels towards the second AP 110-2. For example, the first AP 110-1 may determine an estimation of the CSI for each antenna of the antenna array of the second AP 110-2.

At 220, in order to transmitting the DL TSC packet to the first UE 120-1 without interfering the reception of the Block Acknowledgement of the second AP 110-2, the first AP 110-1 may determine an applicable transmitting power for a transmission from the first AP 110-1 to a the first UE 120-1 during a Block Acknowledgement transmission from the second UE 120-2 to the second AP 110-2.

In some example embodiments, the first AP 110-1 can estimate a CSI of a channel of a UE served by the first AP 110-1, for example, the first UE 120-1 shown in FIG. 1. Furthermore, the first AP 110-1 knows the applicable degrees of freedom of its antenna array, which may refer to degrees of freedom dedicated to generate radiation beams and degrees of freedom dedicated to generate the nulls.

Based on the CSI of channels between the second AP 110-2 and the first AP 110-1, the CSI of a channel between the first AP 110-1 and the first UE 120-1 and information about degree of freedom associated with an antenna array of the first AP 110-1, the first AP 110-1 may determine an ideal design scheme for a precoder and a receiving filter. The precoder may maximize the energy focused towards the first UE 120-1 served by the first AP 110-1 while minimizing the interference generated towards AP 110-2.

Although a plurality of radiation nulls can be placed to avoid interference from the first AP 110-1 towards the antennas elements of antenna array at the second AP 110-2, due to the size of the antenna array at first AP 110-1 and its associated degree of freedom, together with the specific strategy adopted during the design of the precoder and receiving filter, which may be in favour of the beamforming gain rather than the nulling capabilities, some intolerable residual interference might be generated towards the antenna array at the second AP 110-2.

Thus, to further avoid the harmful interference during the transmission of the Block Acknowledgement from the second UE 120-2 to the second AP 110-2, the first AP 110-1 may further determine an estimation of interference suppression of the first AP 110-1 required during the transmission of the Block Acknowledgement from the second UE 120-2 to the second AP 110-2.

Before the transmission from the first AP 110-1 to the first UE 120-1, if the first AP 110-1 determines a transmission from the second AP 110-2 to the second UE 120-2 has started, the first AP 110-1 may determine the residual receiving power based on the devised receiving filter. The first AP 110-1 may also determine a receiving power without the devised receiving filter during transmission from the second AP 110-2 to the second UE 120-2.

Due to the reciprocity of the channel in DL and UL direction, the residual received power is a good estimate of the expected interference generated in turn from first AP 110-1 towards second AP 110-2 when receiving the Block Acknowledgement from the second UE 120-2. Thus, the first AP 110-1 may determine the estimation of the interference suppression required during the transmission of the Block Acknowledgement from the second UE 120-2 to the second AP 110-2 based on the difference between the residual receiving power and receiving power without the devised receiving filter at the first AP 110-1 during the transmission from the second AP 110-2 to the second UE 120-2.

Furthermore, due to the fluctuations of the wireless channel and differences between the precoding and receiving filter adopted by the second AP 110-2, a certain protection margin needs to be considered in the computation of this estimated interference. This protection margin may be defined based on common agreed rules and accurate simulations and requires standardization.

Then the first AP 110-1 may determine a reference transmitting power, which may be referred to as a maximum transmitted power allowed at the first AP 110-1 during the spatial reuse opportunity without null steering. Based on the reference transmitting power, the estimation of the interference suppression to the transmission of the Block Acknowledgement and a certain margin, the first AP 110-1 may determine the applicable transmitting power for a transmission from the first AP 110-1 to a the first UE 120-1 during a Block Acknowledgement transmission from the second AP 110-2 to the second UE 120-2. The applicable transmitting power may be determined as below:

$$P_{TX,AP\ 110\text{-}1}'\ [\text{dBm}]=P_{TX,AP\ 110\text{-}1}\ [\text{dBm}]+L_{null}\ [\text{dB}]-M\ [\text{dB}] \tag{1}$$

where, $P_{TX,AP\ 110\text{-}1}$ is the maximum transmitted power allowed at the first AP 110-1 during the spatial reuse opportunity without null steering, $L_{null}$ is the estimated interference suppression provided by the null accuracy procedure above described' and M is the protection margin that has to consider potential wireless channel fluctuations and errors in estimating $L_{null}$.

It is to be understood that the second AP 110-2 may set the value of the UL Spatial Reuse subfield of the MU-RTS in such a way that, following the similar rationale as for the PSR framework of 802.11ax, the first AP 110-1 can compute the maximum allowed transmission power, $P_{TX,AP\ 110\text{-}1}$, that guarantees the tolerable interference threshold set by the second AP 110-2 during the subsequent uplink data reception of the Block Acknowledgement.

Referring back to FIG. 2, when the precoder/receiving filters of AP 110-1 towards AP 110-2, and the applicable transmitting power for a transmission from the first AP 110-1 to the first UE 120-1 during a Block Acknowledgement transmission are determined, at 230, the first AP 110-1 may perform the transmission from the first AP 110-1 to the first UE 120-1 during a Block Acknowledgement transmission based on the precoder filter and the applicable transmitting power.

In some example embodiments, the first AP 110-1 may perform a precoding process to a TSN data packet to be transmitted to the first UE 120-1 based on the precoder, and transmit the precoded TSN data packet to the first UE 120-1 with the applicable transmitting power during a time interval of the spatial reuse opportunity allowed by the AP 110-2.

In this way, the first AP 110-1 can safely take advantage of the spatial reuse opportunity and occupy the channel even during the transmission of the Block Acknowledgement from the second UE 120-2.

An example method of the power control in the spatial reuse has been described with reference to FIG. 2, to describe the procedure of the spatial reuse more clearly, the process according to the embodiments of the present disclosure may be further described with reference to FIG. 3 and FIG. 4. FIG. 3 shows an example process of the spatial reuse according to some example embodiments of the present disclosure.

Figure 3:
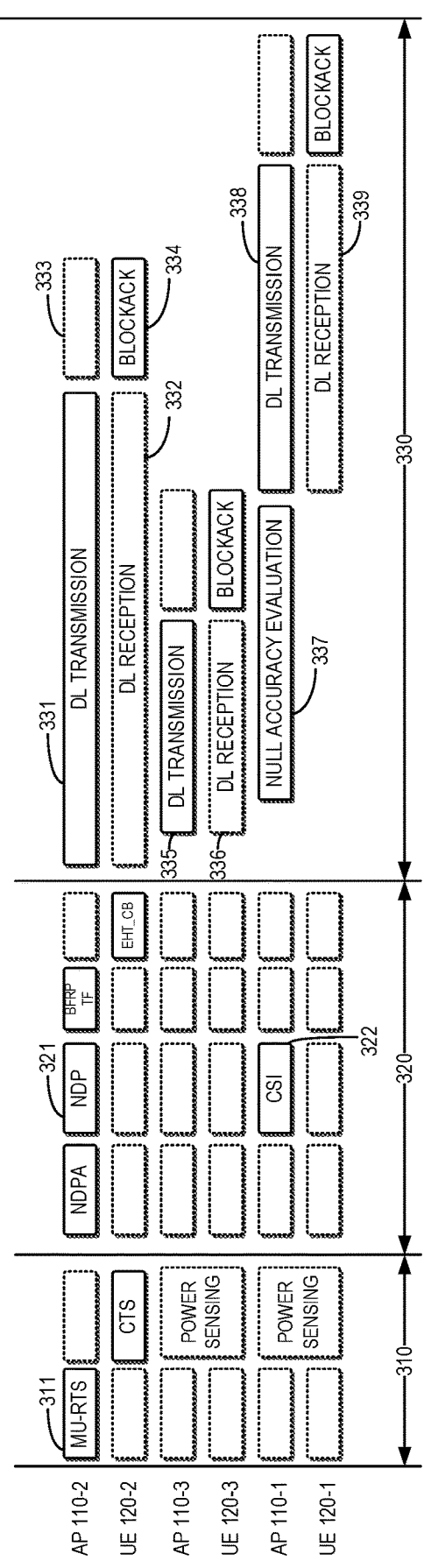
FIG. 3 shows an example process of the spatial reuse according to some example embodiments of the present disclosure.

There are 3 phases shown in FIG. 3. For example, as shown in FIG. 3, in the phase 310, the second AP 110-2 may transmit a trigger frame MU-RTS, which may indicate a spatial reuse opportunity.

In the phase 320, when the second AP 110-2 initiates the transmission of NDP 321, the first AP 110-1 may acquire the CSIs 322 for all antennas of the antenna array of the second AP 110-2. Then the first AP 110-1 may devise a precoder and a receiving filter based on the CSIs.

In the phase 330, when the second AP 110-2 performs the DL transmission 331, 332 between the second AP 110-2 and the UE 120-2, the third AP 110-3, for example, may also perform a DL transmission 335, 336 between the third AP 110-3 and the third UE 120-3. During the DL transmission between the second AP 110-2 and the UE 120-2, the AP 110-1 may perform a null accuracy evaluation 337 based on the devised precoder and receiving filter, to determine a possible interference to the UL transmission 334, 333 between the second UE 120-2 and the AP 110-2 caused by the DL transmission 338, 339 between the first AP 110-1 and the first UE 120-1.

Then the first AP 110-1 may determine a maximum applicable transmitting power for the DL transmission 338, 339 between the first AP 110-1 and the first UE 120-1 and transmit the TSN data packet to the first UE 120-1 based on the determined maximum applicable transmitting power when the UL transmission 333, 334 between the second AP 110-2 and the UE 120-2 is performed.

Figure 4:
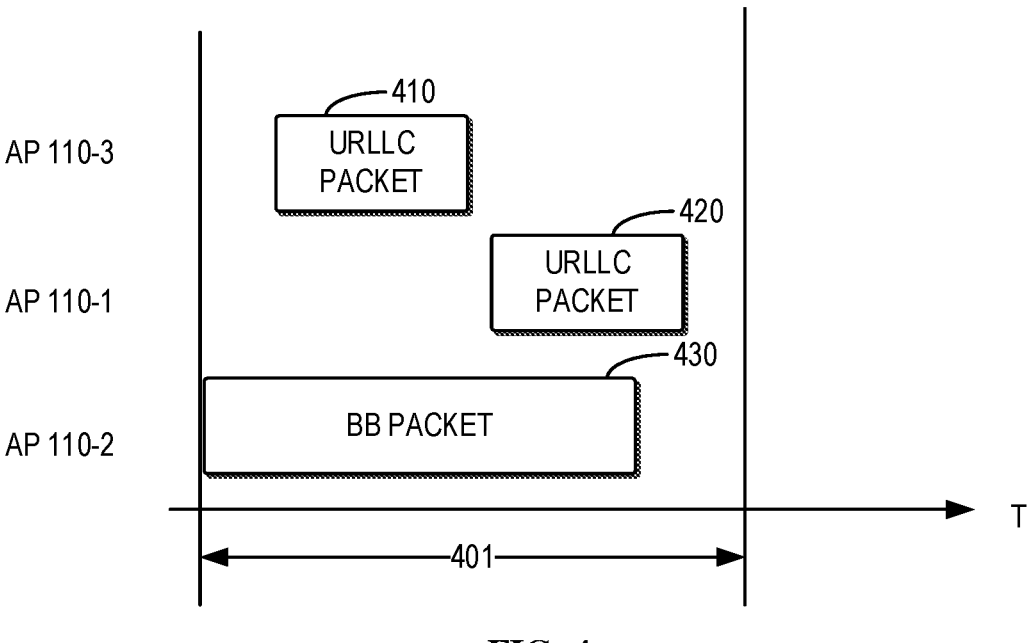
FIG. 4 shows an example transmission of a TSN data packet and a NOTSN data packet in the scenario of the spatial reuse according to some example embodiments of the present disclosure.

FIG. 4 shows an example transmission of a TSN data packet and NOTSN data packets in the scenario of the spatial reuse according to some example embodiments of the present disclosure.

The time interval 401 shown in FIG. 4 may be considered at least as a part of the phase 330 in FIG. 3. The transmission of URLLC packet 410 from the AP 110-3 can correspond to the DL transmission 335, 336 between the third AP 110-3 and the third UE 120-3. The transmission of URLLC packet 420 from the AP 110-1 can correspond to the DL transmission 338, 339 between the first AP 110-1 and the first UE 120-1. The transmission of BB packet 430 can correspond to DL transmission 331, 332 and the UL transmission 334, 333 between the second UE 120-2 and the second AP 110-2-.

As shown in FIG. 4, it can be seen the spatial reuse opportunity can be extended, such that the first AP 110-1 can safely take advantage of the spatial reuse opportunity and occupy the channel even during the transmission of the Block Acknowledgement from the second UE 120-2.

In some example embodiments, an apparatus capable of performing the method 200 (for example, implemented at the first AP 110-1) may comprise means for performing the respective steps of the method 200. The means may be implemented in any suitable form. For example, the means may be implemented in a circuitry or software module.

In some example embodiments, the apparatus comprises means for, in accordance with a determination that a null data packet is transmitted from a second device to a third device, determining Channel State Information, CSI, of a channel between the second device and the third device; means for determining, at least partially based on the CSI, an applicable transmitting power for a first transmission from the first device to a fourth device during a second transmission from the third device to the second device; and means for performing the first transmission based on the applicable transmitting power during the second transmission.

Figure 5:
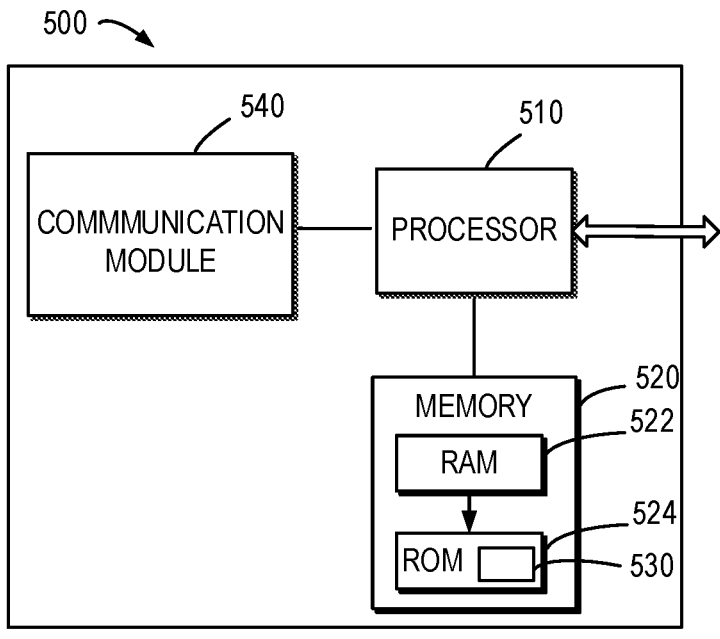
FIG. 5 shows a simplified block diagram of a device that is suitable for implementing example embodiments of the present disclosure.

FIG. 5 is a simplified block diagram of a device 500 that is suitable for implementing embodiments of the present disclosure. The device 500 may be provided to implement the communication device, for example the terminal device 210 and the network device 220 as shown in FIG. 1. As shown, the device 500 includes one or more processors 510, one or more memories 540 coupled to the processor 510, and one or more transmitters and/or receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 2 to 4. The embodiments of the present disclosure may also be implemented by hardware or by a combination of software and hardware.

Figure 6:
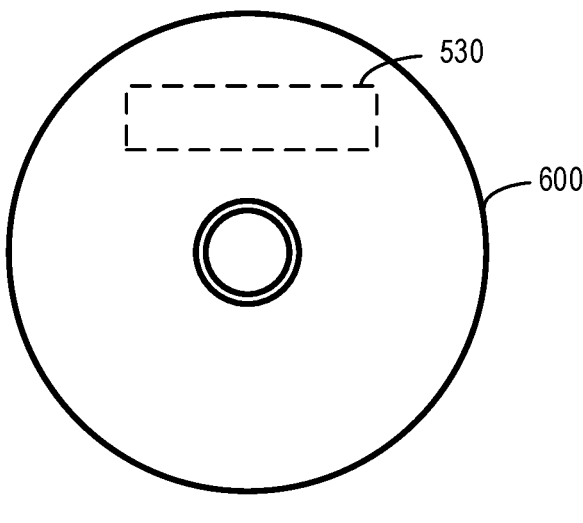
FIG. 6 shows a block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6. shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
at least one processor; and
at least one memory including computer program code;
the at least one memory and the computer program code
   are configured to, with the at least one processor, cause
   the first device at least to:
   in accordance with a determination that at least one
      sounding packet are transmitted from a second
      device, determine Channel State Information (CSI)
      of channels between the second device and the first
      device;
   determine, at least partially based on the CSI, an
      applicable transmitting power for a first transmission
      from the first device to a fourth device during a
      second transmission for a reception of a feedback of
      the at least one sounding packet sent from a third
      device to the second device; and
   perform the first transmission based on the applicable
      transmitting power during the second transmission.

2. The first device of claim 1, wherein the first device is further caused to:
determine a further CSI of further channels between the
   first device and the fourth device;
determine information about degree of freedom associated with an antenna array of the first device; and
determine a precoding pattern for the first transmission
   from the first device to a fourth device based on the CSI
   of the channels between the second device and the first
   device, the further CSI of further channels between the
   first device and the fourth device and the information
   about degree of freedom.

3. The first device of claim 2, wherein the first device is caused to determine the applicable transmitting power by:
determining a filtering pattern based on the CSI, the
   further CSI and the information about degree of freedom;
determining, based on the filtering pattern, an estimation
   of an interference suppression of the first device for the
   second transmission;
obtaining a reference transmitting power of the first
   device and a predetermined margin for the estimation;
   and
determining the applicable transmitting power based on
   the reference transmitting power, the estimation and the
   margin.

4. The first device of claim 3, wherein the first device is caused to determine the estimation of the interference suppression by:
in accordance with a determination that a third transmission from the second device to the third device, determining a receiving power at the first device based on
   the filtering pattern;
determining a further receiving power at the first device
   without the filtering pattern; and determining the estimation of the interference suppression based on the difference between the receiving power and the further receiving power.

5. The first device of claim 2, wherein the first device is caused to perform the first transmission by:

performing a precoding process to a data packet to be transmitted based on the precoding pattern; and transmitting the precoded data packet with the applicable transmitting power.

6. The first device of claim 1, wherein the first device comprises an access point supporting a Time-sensitive communication service, and wherein the fourth device comprises a terminal device.

7. The first device of claim 1, wherein the second device comprises a further access point not supporting a Time-sensitive communication service, and wherein the third device comprises a further terminal device.

8. A method, comprising:

in accordance with a determination that a sounding packet is transmitted from a second device, determining Channel State Information (CSI) of channels between the second device and the first device;

determining, at least partially based on the CSI, an applicable transmitting power for a first transmission from the first device to a fourth device during a second transmission for a reception of a feedback of the at least one packet sent from a third device to the second device; and performing the first transmission based on the applicable transmitting power during the second transmission.

9. The method of claim 8, further comprising:

determining a further CSI of the further channels between the first device and the fourth device;

determining information about degree of freedom associated with an antenna array of the first device; and determining a precoding pattern for the first transmission from the first device to a fourth device based on the CSI of channels between the second device and the first device, the further CSI of the further channels between the first device and the fourth device and the information about degree of freedom, the applicable transmitting power being directed to the fourth device based on the precoding pattern.

10. The method of claim 9, wherein determining the applicable transmitting power comprises:

determining a filtering pattern based on the CSI, the further CSI and the information about degree of freedom;

determining, based on the filtering pattern, an estimation of an interference suppression of the first device for the second transmission;

obtaining a reference transmitting power of the first device and a predetermined margin for the estimation; and determining the applicable transmitting power based on the reference transmitting power, the estimation and the margin.

11. The method of claim 10, wherein determining the estimation of the interference suppression comprises:

in accordance with a determination that a third transmission from the second device to the third device, determining a receiving power at the first device based on the filtering pattern;

determining a further receiving power at the first device without the filtering pattern; and determining the estimation of the interference suppression based on the difference between the receiving power and the further receiving power.

12. The method of claim 9, wherein performing the first transmission comprises:

performing a precoding process to a data packet to be transmitted based on the precoding pattern; and transmitting the precoded data packet with the applicable transmitting power.

13. The method of claim 8, wherein the first device comprises an access point supporting a Time-sensitive communication service, and wherein the fourth device comprises a terminal device.

14. The method of claim 8, wherein the second device comprises a further access point not supporting a Time-sensitive communication service, and wherein the third device comprises a further terminal device.

15. A non-transitory computer readable medium comprising program instructions that, when executed on an apparatus, cause the apparatus to perform at least:

in accordance with a determination that a sounding packet is transmitted from a second device, determining Channel State Information (CSI) of channels between the second device and the first device;

determining, at least partially based on the CSI, an applicable transmitting power for a first transmission from the first device to a fourth device during a second transmission for a reception of a feedback of the at least one packet sent from a third device to the second device; and performing the first transmission based on the applicable transmitting power during the second transmission.

* * * * *